Figure 8:
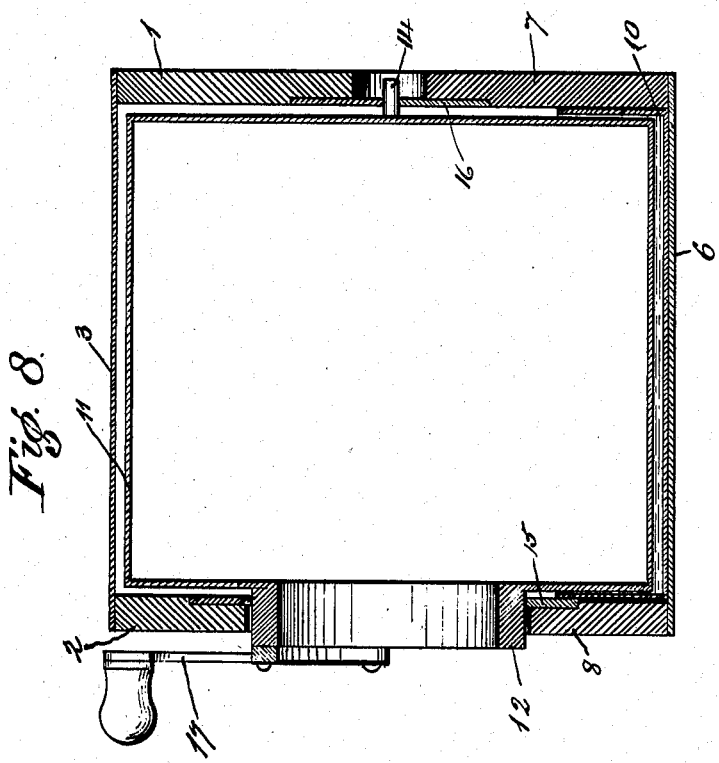

B. A. CASMIRE.
ICE CREAM FREEZER.
APPLICATION FILED MAY 18, 1908.
930,530.
Patented Aug. 10, 1909.
3 SHEETS—SHEET 1.
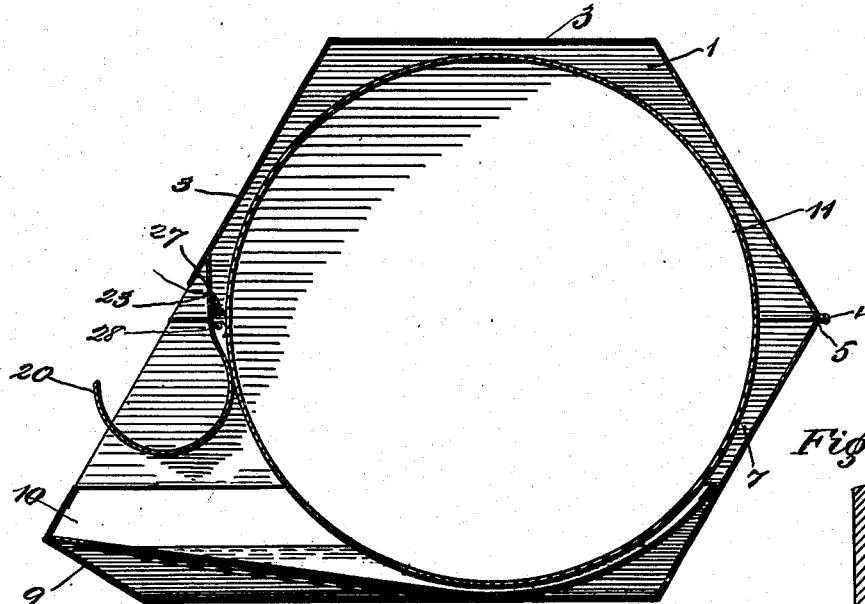
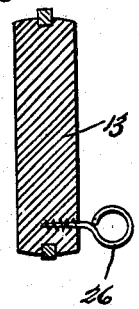
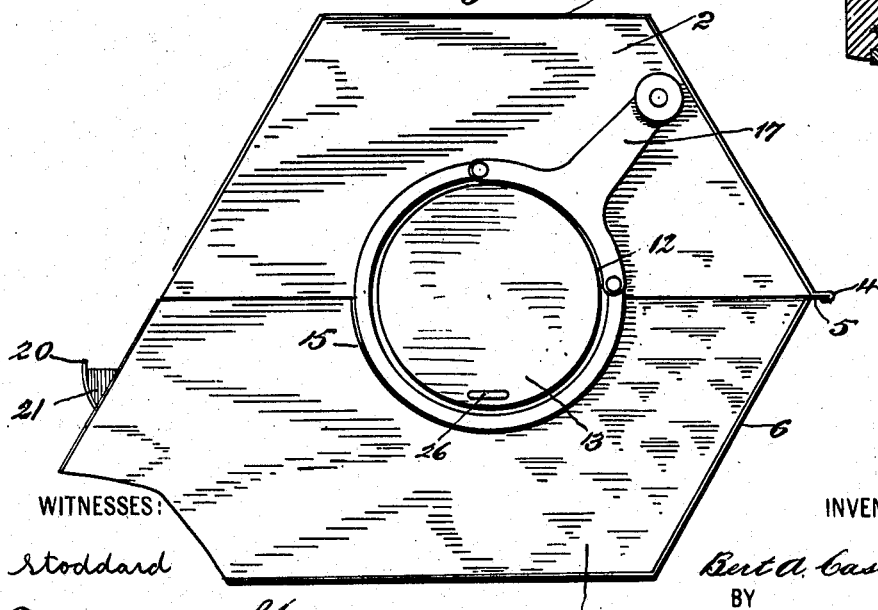
WITNESSES:
E. Stoddard
Francis M. Springer
INVENTOR
Bert A. Casmire
BY
Thompson & Bell
ATTORNEY

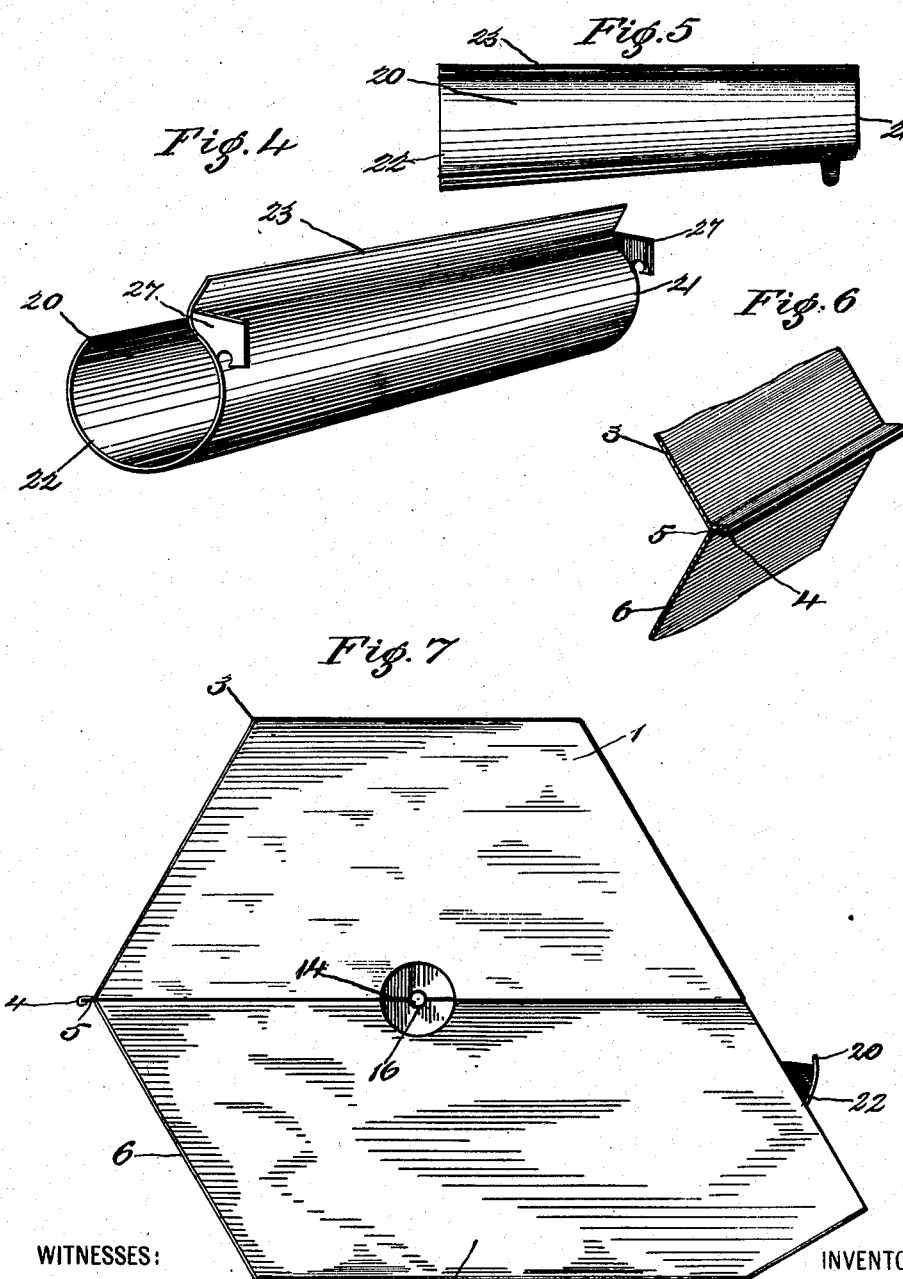

B. A. CASMIRE.
ICE CREAM FREEZER.
APPLICATION FILED MAY 18, 1908.

930,530.

Patented Aug. 10, 1909.
3 SHEETS—SHEET 3.

WITNESSES:
Cornelia Luesche.
Francis M. Springer

INVENTOR
Bert A. Casmire
BY
Thompson & Bell
ATTORNEY

UNITED STATES PATENT OFFICE.

BERT A. CASMIRE, OF MARTINSVILLE, INDIANA.

ICE-CREAM FREEZER.

No. 930,530.　　　Specification of Letters Patent.　　　Patented Aug. 10, 1909.

Application filed May 18, 1908. Serial No. 433,414.

*To all whom it may concern:*

Be it known that I, BERT A. CASMIRE, a citizen of the United States, residing at Martinsville, in the county of Morgan and State of Indiana, have invented certain new and useful Improvements in Ice-Cream Freezers, of which the following is a specification, reference being had therein to the accompanying drawing.

My invention relates to that class of ice-cream freezers known as external freezers in which the refrigerant is placed in a revoluble cylindrical holder.

The object of this invention is to provide a suitable means whereby the fluid to be frozen will be supplied to the periphery of the revoluble refrigerant holder in such quantities as to be very rapidly frozen to be deposited in layers on the peripheral surface of said refrigerant holder; to provide a suitable receptacle or scoop whereby the frozen cream may be readily removed from the periphery of said refrigerant holder and collected therein as formed: also to construct said receptacle, scoop or collecting vessel with a scraping or removing means whereby to rapidly remove the frozen cream from the periphery of said refrigerant holder: also to construct such scoop or receptacle and suspend the same in such a manner that it will swing into such a position as to close the space between said revoluble refrigerant holder and the inclosing casing of the apparatus to effectually exclude the air of the exterior atmosphere and keep the scoop and its contents cool.

I attain these objects by means of the apparatus illustrated in the accompanying drawings in which similar numerals of reference designate like parts throughout the several views.

Figure 1. is a vertical longitudinal sectional view of my invention of an ice-cream freezing apparatus showing the revoluble refrigerant holder, the milk or confection holding pan and the receiving receptacle or scoop for receiving the frozen ice cream or confection as it is removed from the periphery of the refrigerant holder; Fig. 2. is an elevation of the same showing the charging aperture of the refrigerant holder and its closing lid; Fig. 3. is a detail sectional view of the lid of said charging aperture; Fig. 4. is a detail perspective view of the frozen ice cream receptacle or scoop; Fig. 5. is a plan view of said scoop; Fig. 6. is a broken perspective view of a portion of the rear of the casing of the apparatus showing the removable lid of the casing for inclosing the refrigerant holder and the hinge connecting means; Fig. 7. is an elevation of the trunnion side of the apparatus; and Fig. 8. is a transverse vertical section taken at right angles to the section shown in Fig. 1.

The inclosing casing of the apparatus comprises a top or lid portion and a bottom or base portion. The top or lid portion comprises the sides 1 and 2 which is formed like the half of a hexagon and with three equilateral edges and a metallic inclosing casing 3 extends from the side 1 to the side 2 to be secured to the said three equilateral edges thereof. The metallic sheathing 3 is constructed to extend not quite to the bottom of the front edges of said sides for the reason hereinafter set forth, and the back of said metallic sheathing 3 is extended over the ends of the rear bottom edges of said sides to form a hinge or retaining hook 4 which is adapted to receive the projecting end or tongue 5 of the lower metallic casing 6. The casing 6 extends around the edges of the sides 7 and 8 of the base portion of the inclosing casing and terminates at the edge of the shorter side 9 to form a front open space through which to introduce the unfrozen milk or confection containing pan 10 to place the latter in position under the refrigerant holder 11 or remove it therefrom. The refrigerant holder 11 is cylindrical in form and is provided at one end with a neck 12 of cylindrical form provided with a charging opening through which the refrigerant is introduced into the interior of the holder 11 and which opening is closed by a removable lid 13, and said holder 11 is provided at its opposite end with a trunnion 14. The neck 12 and the trunnion 14 are situated centrally of the cylindrical refrigerant holder flat ends and serve the purpose of journals therefor. The neck 12 and the trunnion 14 are removably and revolubly supported in the bearings 15 and 16 formed in the sides 7 and 8 and a crank 17 is provided whereby to revolve the cylindrical refrigerant holder 11.

The construction of the means for removing the frozen cream or confection from the periphery of the cylindrical refrigerant holder 11 and the receptacle or scoop for receiving the frozen cream or confection is important. The trough shaped receptacle or scoop 20 has one of its ends closed and its other end open and much larger than that of the closed end and the said scoop is flared or tapered from its smaller closed end 21 to its larger open end 22. The said scoop is pivotally suspended from a point above its horizontal axis and toward the inner side thereof, so that the scoop 20, at its lower bottom side will contact with the peripheral surface of the cylindrical refrigerant holder 11 for the purpose of maintaining said scoop 20 and the contents thereof at a low temperature and preventing the contents of said scoop 20 from melting. It will be noted that when the scoop 20 is in contact with the periphery of said cylindrical refrigerant holder 11, the scraper 23 formed integral on the inner inclined edge of the scoop 20 or on that edge of the said scoop situated toward the cylindrical refrigerant holder, swings or tilts forwardly and contacts with the front lower edge portion of the casing or sheathing 3 to effectually close the space or opening between the said sheathing or casing 3 and the cylindrical refrigerant holder 11 to exclude air from the interior of the inclosing casing of the apparatus. Suspension lugs 27 are secured to the ends of the scoop 20 in position thereon to cause the bottom inner end of said scoop to rest against said refrigerant receptacle when not tilted to bring the edge of the scraper thereof into contact with the peripheral surface of said cylindrical refrigerant holder 11.

The lid 13 of the neck 12 is provided with a yielding or elastic peripheral ring or band whereby the said lid will readily close the open end of the neck 12 to exclude the air from the interior of the refrigerant holder. A grip or handle 26 is provided whereby to remove said lid which removal is facilitated by situating the grip or handle 26 eccentrically of the lid that is to say, the grip or handle is placed some distance from the center of the said lid so that when the said handle is grasped the lid 13 will tilt and thereby be readily released from the opening of the neck 12.

The suspension lugs of the scoop 20 are provided with the notches formed in the suspension lugs 27 which are adapted to be hooked upon the suspension pins 28 to suspend the said scoop therefrom so that the said scoop may be readily removed and replaced again into position.

I claim:

1. In an ice cream freezer, the combination with an inclosing casing having an opening extending along its front portion, a revolving refrigerant holder, and a confection containing pan extending under said revolving refrigerant holder, an ice cream receptacle pivotally supported at its ends and situated in said opening to extend in front of said refrigerant holder, said receptacle having a longitudinally extending top opening, a scraper situated to extend along the inner edge of said longitudinal top opening, said scraper and ice cream receptacle so situated relatively to the refrigerant holder and said casing, that, when the scraper portion is out of contact with the peripheral portion of said refrigerant holder and in contact with the casing, the lower portion of said receptacle will contact with said refrigerant holder to close the opening between said refrigerant holder and the casing and maintain the ice cream collected in said receptacle cool.

2. In an ice cream freezer, the combination with an inclosing casing having an opening extending along its front portion, a revolving refrigerant holder, and a confection containing pan having its top portion open, said pan situated under and adjacent to said refrigerant holder, an ice cream receptacle, having a smaller closed end and a larger open end, pivotally supported at its ends above the center and at the inner side thereof, said receptacle situated in said opening to extend in front of said refrigerant holder, said receptacle having a longitudinally extending top opening, said opening gradually enlarged or tapered toward the open larger end of said receptacle, a scraper situated to extend along the inner tapered edge of said longitudinal top opening, said scraper and ice cream receptacle so situated relatively to said refrigerant holder and ice cream receptacle that, when the scraper portion is out of contact with the peripheral portion of said refrigerant holder and in contact with said casing, the lower portion of said receptacle will contact with said refrigerant holder to close the opening between said refrigerant holder and said casing and maintain the ice cream collected in said receptacle cool.

In testimony whereof I affix my signature in presence of two witnesses.

BERT A. CASMIRE.

Witnesses:
THOMPSON R. BELL,
FRANCIS M. SPRINGER.